United States Patent [19]

Berleue et al.

[11] 4,088,023

[45] May 9, 1978

[54] LIQUID LEVEL GAUGE

[75] Inventors: Albert J. Berleue, Bradford; William H. Dumbaugh, Jr., Painted Post, both of N.Y.

[73] Assignee: Corning Glass Works, Corning, N.Y.

[21] Appl. No.: 649,665

[22] Filed: Jan. 16, 1976

Related U.S. Application Data

[63] Continuation of Ser. No. 452,196, Mar. 18, 1974, abandoned.

[51] Int. Cl.² .................... G01F 23/02; C03C 3/04
[52] U.S. Cl. .......................................... 73/334; 106/52
[58] Field of Search ................... 106/52, 73.2; 73/328, 73/330, 331, 334

[56] References Cited

U.S. PATENT DOCUMENTS

| 707,943 | 8/1902 | Rockwell | 73/328 |
|---|---|---|---|
| 1,227,305 | 5/1917 | Peterson | 73/328 |
| 2,071,411 | 2/1937 | Lamesch | 73/330 X |
| 2,942,469 | 6/1960 | Le Roy | 73/334 |
| 3,148,543 | 9/1964 | Le Roy | 73/331 |
| 3,573,078 | 3/1971 | Bacon | 106/52 |
| 3,804,646 | 4/1974 | Dumbaugh | 106/52 |

Primary Examiner—Patrick P. Garvin
Assistant Examiner—William G. Wright
Attorney, Agent, or Firm—Clinton S. Janes, Jr.; Clarence R. Patty, Jr.

[57] ABSTRACT

A gauge for exhibiting the liquid level in a container of alkaline liquid, for example a boiler or radiator gauge, is disclosed. The gauge includes a glass component composed at least in part of a glass consisting essentially of 20-50% $SiO_2$, 3-40% $Y_2O_3$, 5-25% of a divalent metal oxide and 0-30% $Al_2O_3$. Other features of the invention include use of an yttrium concentrate in producing the glass and a composite glass component wherein only a facing portion is composed of the yttrium glass.

8 Claims, 2 Drawing Figures

LIQUID LEVEL GAUGE

This is a continuation of application Ser. No. 452,196, filed Mar. 18, 1974, now abandoned.

BACKGROUND OF THE INVENTION

This invention relates to a gauge for measuring and/or exhibiting the liquid level in a container of alkaline liquid. It is more particularly concerned with a glass component for such gauge which has a strong resistance to alkali attack.

Traditionally, gauges of this sort have been used to observe the water level in boilers for heating and power generating plants. The observation window in such boiler may take the form of a flat, glass block or bar, and is frequently called a sight glass. The inside surface of such sight glass is necessarily exposed to a corrosive environment provided by a combination of high pressure steam and hot water which tends to be of an alkaline nature.

Recently, a liquid level monitoring system, based on fiber optic principles, has been proposed for use in truck radiators and the like. In this system, light is transmitted to and from a glass sensor via flexible fiber optics. The sensor may be a glass prism which, when covered with liquid, refracts into the liquid and thus dissipates any light received within the prism. Conversely, when the prism is uncovered, as by a drop in liquid level, input light is reflected back to a return or pickup fiber optic whereby a warning signal is activated. The glass prism must have a high resistance to corrosive alkaline attack so that a relatively clear surface, needed for effective operation of the system, is maintained over an extended period of time.

Conventional glasses deteriorate rapidly in an alkaline environment. Consequently, mica has been substituted as a visual medium because it is one of the few transparent materials other than glass that will withstand such alkaline attack to any degree. However, mica is a relatively expensive material for this use. Also, the resistance to alkaline attack is erratic, that is, it may vary greatly from one type of mica to another, or even between lots of the same type. Accordingly, extensive studies have been made in a search for glasses having a greater resistance to alkaline attack.

It has been proposed to incorporate substantial amounts of zirconia ($ZrO_2$) in a silicate glass to enhance the resistance of such glass to alkaline attack. This is disclosed for example in "The Properties of Glass" by G. W. Morey published by Reinhold Publishing (1938). One such commercial glass is composed essentially of 12.5% $R_2O$, 16.5% $ZrO_2$ and 71% $SiO_2$. Such glasses are difficult to melt and work, and still fail to provide the degree of resistance to alkaline attack required in many applications. A more easily melted $Na_2O$-$B_2O_3$-$Al_2O_3$-$SiO_2$ glass has been developed for production of commercial gauge glasses, but the alkali resistance thereof is not as great as would be desired.

The mechanism of alkali attack on a silicate glass involves the reaction of the hydroxyl ion with the glass network:

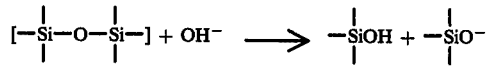

The attack is generally manifested by a weight loss and a deterioration of surface appearance. The action of steam and hot water on glass involves a similar mechanism. However, the initial step is a dissolution of alkali cations from the glass. This creates an alkaline solution at the glass surface, which then attacks the glass by the above reaction. The reaction between a soda-containing, silicate glass and water would be:

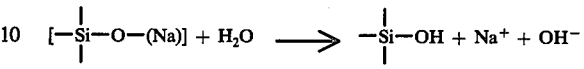

Therefore, a glass with good alkali durability should also be resistant to attack by hot water and steam.

One method used to determine resistance of a material to alkaline attack is to treat a polished plate in 5% sodium hydroxide solution at 95° C. for 6 hours. The loss of weight is determined and reported as milligrams per square centimeter of surface area. Appearance change is also noted. Materials that show promise in this test may then be evaluated in hot water and steam at 215° to 365° C. for 24 to 28 hours. Alternatively, they may be subjected to steam and hot water containing 0.5% sodium sulfate and 0.11% sodium carbonate at 215° C. for 3 hours in a test known as the Pennsylvania Railroad Test.

Copending application Ser. No. 273,435, filed July 20, 1972 by one of us, now U.S. Pat. No. 3,804,646, discloses silicate glasses characterized by very high elastic moduli, a property which makes such glasses particularly useful for producing fibers, ribbons and other glass forms that impart strength to plastic composites. These glasses are composed essentially of, in mole percent, 25–60% $SiO_2$, 5–30% $Al_2O_3$, 5–40% MgO, and 8–40% of a high field strength modifier of the group $TiO_2$, $Ta_2O_5$, $La_2O_3$, $Y_2O_3$, CaO and $ZrO_2$.

SUMMARY OF THE INVENTION

We have now discovered that a small family of glasses within this broad group is unique in that its members possess phenomenally better resistance to alkaline attack than prior known glasses. This characteristic alkaline resistance, as well as favorable glass working properties, particularly adapts these glasses to purposes of the present invention.

Our invention is a gauge for exhibiting the liquid level in a container of alkaline liquid and including a glass component having a portion exposed to the alkaline liquid that consists essentially of, in percent by weight on an oxide basis, 20–50% $SiO_2$, 3–40% $Y_2O_3$, 5–25% of a divalent metal oxide and 0–30% $Al_2O_3$. In accordance with one embodiment of the invention the glass component is composed entirely of a glass as defined above. In accordance with another embodiment, the glass contains substantial amounts of one or more lanthanide oxides in its composition and is produced by using, as a glass batch ingredient, an yttrium concentrate essentially composed of yttrium oxide and such lanthanide oxides. Finally, the glass component may be a specially faced or laminated composite having a front portion and a back portion integrally sealed together. The front portion is composed of a glass in accordance with the invention as defined above, and the back portion is composed of a second glass having a different composition but a compatible coefficient of thermal expansion.

Description of the Invention

Glasses for use in accordance with our invention require at least 20% $SiO_2$ for the formation of good quality glass. However, resistance to alkaline attack tends to diminish with increasing silica so that contents greater than about 50% are not desirable. The remarkable durability of the glasses against alkaline attack is a function of yttrium content. At least 3% is necessary for a substantial effect, but large contents of $Y_2O_3$ tend to cause very high liquidus temperatures and consequent problems in glass working and forming. These can be alleviated somewhat by adding a few percent of other oxides, such as $La_2O_3$ for example.

The divalent metal oxides tend to flux the more difficult melting silica and yttria without serious loss of alkali resistance. While any of the divalent metal oxides may be used for flux purposes, an alkaline earth, and more particularly magnesia (MgO), is preferred because it generally provides a higher degree of alkaline resistance. $Al_2O_3$, while not required, is desirable as an assist in glass formation. However, as the content of either $Al_2O_3$ or the divalent metal oxides increases the liquidus temperature tends to increase, so that glass working and forming by normal means becomes more difficult.

Other compatible metal oxides may be present as required for such purposes as adjusting thermal expansion coefficient, glass viscosity, refractive index and other glass properties, although care must be exercised to avoid serious loss in alkaline resistance. For example, up to 10% $TiO_2$, up to 16% $ZrO_2$, up to 35% $La_2O_3$, up to 25% $Ta_2O_5$ and up to 10% $Nb_2O_5$ have been added to present glasses with either no loss in resistance or some degree of improvement. However, large contents of these oxides are generally avoided because of batch cost and difficulty in glass melting and working. Minor amounts of conventional glass fining agents, such as arsenic and antimony oxides, are contemplated. Other glass formers, such as $B_2O_3$ and $P_2O_5$, and the alkali metal oxides, $K_2O$ and $Na_2O$, may be tolerated in some instances, but are generally avoided because of possible adverse effect on durability.

TABLE I, below, sets forth, in percent by weight on an oxide basis, the compositions for several glasses which might be used to produce components within the scope of the invention. Also shown are glass properties including annealing point (A.P.) and strain point (St.P.) in degrees Centigrade, average thermal expansion coefficient (Exp. $\times 10^{-7}$) over the range 25°–300° C., and weight loss in mg./cc. as determined by the NaOH test described above.

TABLE I

|  | 1 | 2 | 3 | 4 | 5 |
|---|---|---|---|---|---|
| $SiO_2$ | 42.0 | 28.9 | 35.0 | 28.0 | 35.0 |
| $Al_2O_3$ | 15.6 | 14.0 | 1.5 | — | 17.5 |
| MgO | 22.8 | — | 17.5 | — | — |
| BaO | — | — | — | 18.0 | — |
| CaO | — | 15.4 | — | — | — |
| PbO | — | — | 16.5 | — | — |
| ZnO | — | — | — | — | 17.5 |
| $Y_2O_3$ | 19.7 | 31.1 | 30.0 | 8.8 | 30.0 |
| $TiO_2$ | — | 10.6 | — | — | — |
| $La_2O_3$ | — | — | — | 19.1 | — |
| $Ta_2O_5$ | — | — | — | 26.0 | — |
| A.P. | 757 | — | — | 857 | 758 |
| St.P. | 721 | — | — | 821 | 721 |
| Exp. $\times 10^{-7}$ | 58.3 | — | — | 65.7 | 47.8 |
| Wt.Loss | 0.01 | 0.01 | <0.01 | <0.01 | 0.03 |

The exceptional resistance of the present glasses may be seen from a comparison in TABLE II below wherein a glass of the present invention is compared with two commercial glasses specifically designed for alkali resistance and gauge glass production.

TABLE II

|  | A | B | 6 |
|---|---|---|---|
| $SiO_2$ | 70.8 | 78.0 | 32.1 |
| $Al_2O_3$ | — | 5.2 | 15.5 |
| $B_2O_3$ | — | 8.6 | — |
| $ZrO_2$ | 16.4 | — | — |
| $TiO_2$ | — | — | 6.1 |
| MgO | — | — | 12.3 |
| $Y_2O_3$ | — | — | 34.0 |
| $Na_2O$ | 11.5 | 5.4 | — |
| $K_2O$ | — | 0.4 | — |
| $Li_2O$ | 1.0 | 0.3 | — |
| $Sb_2O_3$ | — | 1.2 | — |
| $As_2O_3$ | 0.3 | 0.9 | — |
| Wt.Loss | 0.14 | 0.71 | <0.01 |
| Appearance | Iridescent | Stained | No Change |

The superiority of glasses in accordance with the present invention, as exemplified by example 6 in TABLE II, may further be seen from a comparison test made with mica. A body formed from the glass of example 6 and a body formed from mica were tested by exposure, for a period of 24 hours, to water at a temperature of 365° C. and also to steam under the same conditions. The glass showed a weight loss of 0.04 mg./cm.$^2$ in water and 0.02 in steam, whereas mica showed a loss of 0.01 mg./cm.$^2$ in water and 0.10 mg./cm.$^2$ in steam. In all cases there was no appearance change.

It will be understood that a small weight loss can be tolerated provided there is not a substantial impairment of the optical character of the surface by roughening or by deposit. Thus, while weight loss is a convenient means of comparison, appearance of the surface may be considered the ultimate test of utility.

The present glasses may be melted at 1500°–1650° C. in electrically heated melting units and cast or otherwise molded to desired shape. Oxides, or suitable salts, may be used in compounding batches.

However, fully refined yttrium oxide is a very expensive batch ingredient at approximately $40 per pound. A particularly important feature of our invention, from the standpoint of practical economics then, is the use of yttrium concentrates as batch materials. These are partially refined raw materials which contain varying amounts of yttrium oxide mixed with oxides of various elements in the lanthanide series, e.g. $Dy_2O_3$, $La_2O_3$, $CeO_2$ and $Gd_2O_3$. These oxides do not appear to have any detrimental effect on durability, at least in the amounts normally occurring, but may be useful as melting aids or in reducing glass liquidus temperatures.

TABLE III sets forth the detailed analysis for two such yttrium concentrates which we have used in our glasses:

TABLE III

|  | Y-3 | Y-4 |
|---|---|---|
| $Y_2O_3$ | 76.4 | 38.2 |
| $La_2O_3$ | — | 8.2 |
| $Dy_2O_3$ | 14.2 | 8.2 |
| $Gd_2O_3$ | — | 7.3 |
| $Nd_2O_3$ | — | 7.0 |
| $Sm_2O_3$ | — | 4.1 |
| $Er_2O_3$ | 6.1 | 3.9 |
| ZnO | — | 4.3 |
| CaO | — | 4.6 |
| $Yb_2O_3$ | — | 2.0 |
| $Ho_2O_3$ | 2.3 | 2.2 |
| $Pr_2O_3$ | — | 1.6 |
| $CeO_2$ | 0.01 | 1.5 |
| $Tb_2O_3$ | 1.2 | 1.5 |
| MgO | — | 1.4 |
| $Eu_2O_3$ | 0.01 | 0.3 |

TABLE III-continued

|  | Y-3 | Y-4 |
| --- | --- | --- |
| $Al_2O_3$ | — | 0.5 |
| MnO | — | 0.1 |
| $ThO_2$ | 0.01 | — |
| $SO_3$ | — | 2.4 |
| $Fe_2O_3$ | — | 0.7 |

TABLES IVA and IVB set forth, respectively, batch compositions and oxide compositions for several glasses having particular utility in the present invention and exemplify use of yttrium concentrates in their production:

TABLE IVA

|  | 7 | 8 | 9 | 10 | 11 |
| --- | --- | --- | --- | --- | --- |
| Sand(−200 mesh) | 1440 | 576 | 200 | 779.2 | 235 |
| Alumina(calcined) | 720 | 288 | 80 | 291.8 | 84 |
| Magnesia | 570 | 228 | 70 | 341.8 | 40 |
| Yttrium concentrate (Y-3) | 1440 | 76 | — | 1073.7 | 60 |
| Yttrium concentrate (Y-4) | — | — | 225 | — | — |
| Lanthana | — | 628 | — | — | — |
| Lanthana Concentrate | — | — | — | — | 277 |
| Zircon(milled) | — | — | — | 181.8 | — |
| Titania | 30 | — | — | — | — |
| Melting Temp. (° C.) | 1600 | 1650 | 1550 | 1650 | 1600 |
| Melting Time (hrs.) | 1 | 16 | 16 | 16 | 16 |

TABLE IVB

|  | 7 | 8 | 9 | 10 | 11 |
| --- | --- | --- | --- | --- | --- |
| $SiO_2$ | 34.5 | 32.1 | 39.6 | 31.4 | 38.0 |
| $Al_2O_3$ | 17.0 | 15.9 | 15.9 | 10.9 | 13.5 |
| MgO | 13.4 | 12.5 | 14.1 | 12.6 | 6.3 |
| $TiO_2$ | 0.7 | — | — | — | — |
| $Y_2O_3$ | 26.2 | 3.2 | 12.1 | 30.8 | 7.4 |
| $Dy_2O_3$ | 4.9 | 0.6 | 2.6 | 5.7 | 1.4 |
| $Er_2O_3$ | 2.1 | 0.3 | 1.2 | 2.5 | 0.6 |
| $Ho_2O_3$ | 0.8 | 0.1 | 0.7 | 0.9 | 0.2 |
| $Tb_2O_3$ | 0.4 | 0.1 | 0.3 | 0.5 | 0.2 |
| $La_2O_3$ | — | 35.0 | 2.6 | — | 21.0 |
| $CeO_2$ | — | — | 0.4 | — | 0.3 |
| $Pr_6O_{11}$ | — | — | 0.5 | — | 2.3 |
| $Nd_2O_3$ | — | — | 2.2 | — | 8.7 |
| $Sm_2O_3$ | — | — | 1.3 | — | — |
| CaO | — | — | 1.6 | — | — |
| ZnO | — | — | 1.4 | — | — |
| $Gd_2O_3$ | — | — | 2.3 | — | — |
| $ZrO_2$ | — | — | — | 4.5 | — |
| $Yb_2O_3$ | — | — | 0.6 | — | — |

The glasses of Examples 7 and 11 were tested in accordance with the Pennsylvania Railroad Test mentioned earlier and each was found to have a weight loss less than 0.01 mg./cm.$^2$ and to have undergone no change in appearance. The glass of Example 9 gave a similar result except that a faint translucency could be noted on the surface. The glass of Example 8 was subjected to water and steam for 24 hours at 365° C. A weight loss of 0.01 mg./cm.$^2$ was observed in the water test and 0.13 mg./cm.$^2$ in the steam. In each case, a slight translucency was observable after the test.

We have also found that a sight glass, or similar gauge glass member, may be composed completely of an yttrium glass as defined above, or may be a composite consisting of a facing of such glass and a backing of a second glass having compatible expansion characteristics and being sealed to the facing glass. Such construction, another aspect of our invention, minimizes the amount of the expensive yttrium glass used and hence the element cost.

DESCRIPTION OF THE DRAWING

This aspect of the invention is further described with reference to the accompanying drawing wherein.

FIG. 1 shows a fragment of a boiler wall 10 having an opening 12 covered by a sight glass 14 held in position by clamping member 16 which exerts pressure through gasket 17 to press glass 14 tightly against wall 10, again through the medium of gasket 18. As is well known, glass 14 may be provided with ground glass surface 19 which, in conjunction with gasket 18, forms a pressure tight seal with corresponding areas on wall 10. In accordance with one embodiment of the present invention, sight glass 14 is produced from a RO—$Y_2O_3$—$SiO_2$ glass as described above.

Figure 1:
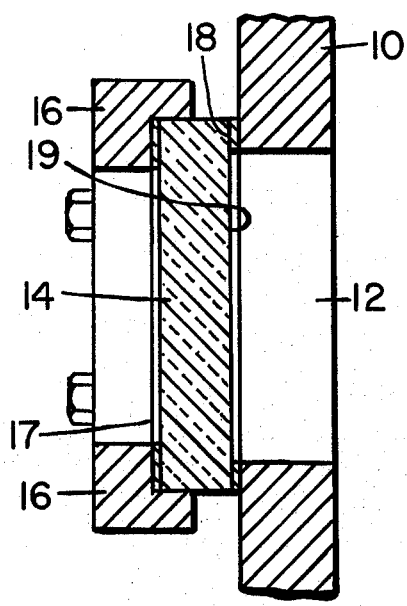
FIG. 1 is a view in cross-section of a typical simple boiler gauge glass installation.
Figure 2:
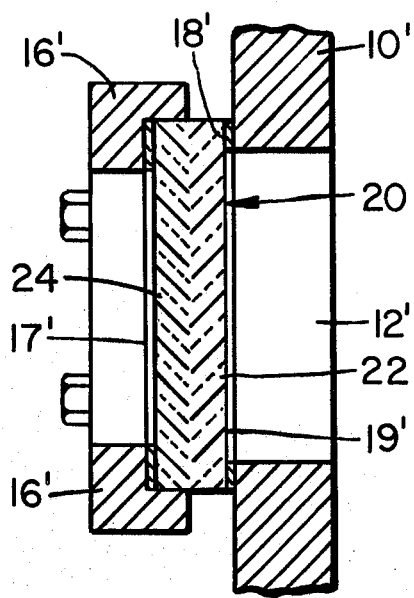
FIG. 2 is a similar view in cross-section illustrating a particular embodiment of the invention.

In accordance with another embodiment, as illustrated in FIG. 2, a special laminated or faced sight glass 20 is provided as the glass component of the gauge. Various elements in FIG. 2 corresponding to those in FIG. 1 are indicated by primed numbers. Thus sight glass 20 covers an opening 12' in wall 10' and is held in position by clamping member 16'.

Sight glass 20 consists of a thin layer 22 of expensive, high durability glass as described earlier. Layer 22 is applied to a thicker layer or slab 24 of a less expensive glass. The glass of layer 24 is sealed to layer 22, thus requiring that the glasses have compatible coefficients of thermal expansion and be otherwise compatible so that the interface is clear and free of observable defects. Care must, of course, be taken to insure that durable glass layer 22 is mounted facing inwardly so that it alone is exposed to the liquid within the boiler or other container.

Sight glass 20 may be produced by melting the two glasses in separate, but closely positioned, units. Layer 22 is produced by pouring the durable glass into a mold (not shown) to desired depth. The glass is cooled to about its softening point and the less durable glass is then poured over it to fill the mold and provide backing layer 24. The composite thus formed is then transferred to an annealing chamber and allowed to cool in controlled manner. It will be appreciated that other laminating practices, as for example that disclosed in U.S. Pat. No. 3,582,306, granted June 1, 1971 to J. W. Giffen, can be employed.

TABLES VA and VB set forth glass compositions and molding conditions for three different composites produced in the manner described above.

TABLE VA

|  | 11 | | 12 | | 13 | |
| --- | --- | --- | --- | --- | --- | --- |
|  | Body Glass | Skin Glass | Body Glass | Skin Glass | Body Glass | Skin Glass |
| Sand (−200 Mesh) | 288 | 288 | 576 | 576 | 752 | 1440 |
| Alumina, Calcined | 144 | 144 | 288 | 288 | 172 | 720 |
| Magnesia | 120 | 120 | 240 | 240 | — | 570 |
| Titania | — | — | — | — | — | 30 |
| Calcium Carbonate | — | — | — | — | 504 | — |
| Yttria | — | 300 | — | — | — | — |
| Lanthana | 300 | — | 600 | — | — | — |
| Yttrium Concentrate (Y-3) | — | — | — | 600 | — | 1440 |
| Melting Time: | 4 hrs. | | 16 hrs. | | 1 hr. | |

TABLE VA-continued

|  | 11 | | 12 | | 13 | |
| --- | --- | --- | --- | --- | --- | --- |
|  | Body Glass | Skin Glass | Body Glass | Skin Glass | Body Glass | Skin Glass |
| Mold Size: | 1" × 2¼" × 9" steel | | 1" × 2¼" × 9" steel | | ½" O.D. × ¼" graphite | |
| Skin Thickness: | ⅛" | | ⅛" | | ⅛" | |
| Body Glass: | ¾" | | 1" | | ¼" | |
| Annealing Time: | 4 hrs. | | 4 hrs. | | 1 hr. | |

TABLE VB

|  | 11 | | 12 | | 13 | |
| --- | --- | --- | --- | --- | --- | --- |
|  | Body Glass | Skin Glass | Body Glass | Skin Glass | Body Glass | Skin Glass |
| $SiO_2$ | 33.9 | 34.5 | 33.9 | 33.9 | 62.5 | 34.4 |
| $Al_2O_3$ | 16.8 | 17.1 | 16.8 | 16.8 | 14.2 | 17.0 |
| MgO | 13.9 | 14.1 | 13.9 | 13.9 | — | 13.4 |
| $TiO_2$ | — | — | — | — | — | .7 |
| CaO | — | — | — | — | 23.3 | — |
| $Y_2O_3$ | — | 34.3 | — | 27.1 | — | 26.3 |
| $La_2O_3$ | 35.4 | — | 35.4 | — | — | — |
| $Dy_2O_3$ | — | — | — | 5.0 | — | 4.9 |
| $Er_2O_3$ | — | — | — | 2.1 | — | 2.1 |
| $Ho_2O_3$ | — | — | — | .8 | — | .8 |
| $Tb_2O_3$ | — | — | — | .4 | — | .4 |
| A.P., °C. | 756 | — | 755 | 789 | 757 | 778 |
| St.P., °C. | 720 | — | 720 | 751 | 717 | 740 |
| 5% NaOH, Appearance | — | No Change | — | No Change | — | No Change |
| Wt. Loss | | 0.01 | | 0.01 | | <0.01 |
| Exp. × $10^7$/°C. | 50.1 | 59.1 | 50.1 | 57.7 | 55.7 | 55.8 |

In general, it is desirable that the thermal expansion characteristics of the two glasses match so that stresses do not develop on cooling. However, the actual concern is that permanent stress does not develop and remain in the cooled product. Therefore, the critical requirement is that the overall expansion change in one of the glasses below the annealing point of the softest glass is essentially equal to the change in the other glass. This might also be expressed as approximately equal expansion coefficients as measured over the range of room temperature to the setting point or annealing point of the softest glass, and this condition is referred to herein as compatible coefficients of thermal expansion.

However, it is customary to measure the expansion coefficient of a glass over the range of 25° to 300° C. Accordingly, these values, as may be seen from the tables above, may or may not be closely matched, depending on the shape of the expansion curves for the respective glasses. Nevertheless, they have been used to characterize the glasses because of their common usage in the art.

We claim:

1. In a gauge for exhibiting the liquid level in a container of alkaline liquid, the improvement which comprises including in said gauge a glass component that is exposed to the alkaline liquid, which glass, when treated in a 5% by weight NaOH solution at 95° C. for six hours, demonstrates essentially no change in appearance and a weight loss of no more than about 0.03 mg/cm$^2$, said glass component consisting essentially, in percent by weight on an oxide basis, of 20-50% $SiO_2$, 3-40% $Y_2O_3$, 5-25% of a divalent metal oxide selected from the group consisting of the alkaline earth metal oxides and ZnO, and 0-30% $Al_2O_3$.

2. A gauge in accordance with claim 1 wherein the alkaline earth metal oxide is magnesia.

3. A gauge in accordance with claim 1 wherein the glass composition includes at least one lanthanide oxide.

4. A gauge in accordance with claim 3 wherein the lanthanide oxide is lanthana.

5. A gauge in accordance with claim 1 wherein the glass component consists of a facing of a glass consisting essentially, in percent by weight on an oxide basis, of 20-50% $SiO_2$, 3-40% $Y_2O_3$, 5-25% of a divalent metal oxide selected from the group consisting of the alkaline earth metal oxides and ZnO, and 0-30% $Al_2O_3$, and a backing of a glass having a different composition but a compatible coefficient of thermal expansion.

6. A gauge in accordance with claim 5 wherein the alkaline earth metal oxide is magnesia.

7. A gauge in accordance with claim 5 wherein the facing glass composition includes at least one lanthanide oxide.

8. A gauge in accordance with claim 7 wherein the lanthanide oxide is lanthana.

* * * * *